(12) United States Patent
Zhang

(10) Patent No.: US 10,616,366 B2
(45) Date of Patent: Apr. 7, 2020

(54) MESSAGE TRANSMISSION METHOD AND DEVICE

(71) Applicant: ZTE CORPORATION, Guangdong (CN)

(72) Inventor: Ning Zhang, Guangdong (CN)

(73) Assignee: ZTE Corporation, Shen (KR)

( * ) Notice: Subject to any disclaimer, the term of this patent is extended or adjusted under 35 U.S.C. 154(b) by 174 days.

(21) Appl. No.: 15/737,171

(22) PCT Filed: Apr. 28, 2016

(86) PCT No.: PCT/CN2016/080495
§ 371 (c)(1),
(2) Date: Dec. 15, 2017

(87) PCT Pub. No.: WO2016/202102
PCT Pub. Date: Dec. 22, 2016

(65) Prior Publication Data
US 2018/0198886 A1    Jul. 12, 2018

(30) Foreign Application Priority Data
Jun. 15, 2015    (CN) .......................... 2015 1 0332157

(51) Int. Cl.
*H04L 29/08* (2006.01)
*H04L 29/06* (2006.01)
(Continued)

(52) U.S. Cl.
CPC ........ *H04L 67/303* (2013.01); *G06F 9/45558* (2013.01); *H04L 29/06* (2013.01);
(Continued)

(58) Field of Classification Search
CPC . H04L 67/303; H04L 29/08; H04L 29/08063; H04L 29/08567; G05F 9/45558
See application file for complete search history.

(56) References Cited

U.S. PATENT DOCUMENTS 9,160,810 B2 * 10/2015 Luxenberg ............ H04L 67/322
2003/0191838 A1 * 10/2003 Tsao .................... H04L 67/1097
709/225
(Continued)

FOREIGN PATENT DOCUMENTS

| CN | 101656718 A | 2/2010 |
|---|---|---|
| CN | 101877713 A | 11/2010 |

(Continued)

OTHER PUBLICATIONS

International Search Report dated Jul. 21, 2016 for International Application No. PCT/CN2016/080495, 7 pages.
(Continued)

*Primary Examiner* — El Hadji M Sall
(74) *Attorney, Agent, or Firm* — Knobbe Martens Olson & Bear LLP

(57) ABSTRACT

The present disclosure provides a message transmission method and apparatus. The method includes: a virtual machine control center (VMC) establishing a link of a message transmission between the VMC and a client side, herein, the client side is used to link and operate a virtual machine; the VMC performing the message transmission with the client side according to the established link.

10 Claims, 8 Drawing Sheets

(51) Int. Cl.
*G06F 9/455* (2018.01)
*H04L 12/58* (2006.01)
*H04L 12/46* (2006.01)

(52) U.S. Cl.
CPC .. *H04L 29/08063* (2013.01); *H04L 29/08567* (2013.01); *H04L 67/10* (2013.01); *H04L 67/38* (2013.01); *G06F 2009/45595* (2013.01); *H04L 12/4641* (2013.01); *H04L 51/04* (2013.01)

(56) References Cited

U.S. PATENT DOCUMENTS

| | | | |
|---|---|---|---|
| 2010/0325279 A1* | 12/2010 | Heim | G06F 9/4856 709/226 |
| 2011/0209064 A1 | 8/2011 | Jorgensen et al. | |
| 2013/0060946 A1* | 3/2013 | Kenneth | G06F 12/0866 709/226 |
| 2013/0283269 A1 | 10/2013 | Jorgensen et al. | |
| 2015/0067065 A1 | 3/2015 | Dolph et al. | |
| 2015/0095432 A1 | 4/2015 | Soundararajan | |

FOREIGN PATENT DOCUMENTS

| | | |
|---|---|---|
| CN | 103186408 A | 7/2013 |
| CN | 103248668 A | 8/2013 |
| CN | 104113510 A | 10/2014 |

OTHER PUBLICATIONS

Written Opinion of the International Searching Authority dated Jul. 21, 2016 for International Application No. PCT/CN2016/080495, 3 pages.

Extended European Search Report of corresponding Application No. 16810843.9—9 pages (Jan. 29, 2019).

Office Action of corresponding Chinese Patent Application No. 201510332157.9—10 pages (Jun. 25, 2019).

Yan Yueqiang, "Design and Implementation of Desktop Cloud Platform's Communication Module"—35 pages (Translation of Abstract Included).

* cited by examiner

MESSAGE TRANSMISSION METHOD AND DEVICE

CROSS REFERENCE TO RELATED APPLICATIONS

This application is the U.S. National Phase Application under 35 U.S.C. § 371 of International Application No. PCT/CN2016/080495, filed Apr. 28, 2016, designating the U.S. and published as WO 2016/202102 A1 on Dec. 22, 2016, which claims the benefit of Chinese Patent Application No. 201510332157.9, filed Jun. 15, 2015, which are hereby incorporated by reference in their entirety.

TECHNICAL FIELD

The present disclosure relates to a communication field, and in particular, relates to a message transmission method and apparatus.

BACKGROUND

A cloud desktop system has gradually become a new selection as an alternative to a physical computer due to its advantages such as its energy conservation, low frequency of device replacement, working conveniently outside the office, convenient maintenance, and information security, etc. A cloud desktop virtual machine uses simulation hardware and an operating system running environment to perform a function simulation of the physical computer, and keeps the using habits of users on the physical computer, so that the users' habits may be seamlessly migrated from the physical computer to a virtual computer.

The current virtual machine is to realize functions of the physical computer at a cloud side from a functional perspective. If the user performs communications for information through an instant communication tool, it may realize through an application software installed on the computer, in which it needs the operating system to be in a running state.

Because the communication software is running depending on the operating system, on the one hand, the communication software takes up resources of the operating system of the virtual computer, and on the other hand, a communication interface of the running communication software cannot be displayed in parallel with other windows. For the above-mentioned other hand, the communication software generally has a window interface, the window interface takes up a screen display area, and the user needs to perform an appropriate adjustment for the size or a hide or show adjustment with other windows which need to be displayed also, so that the user inevitably performs a switching operation of the windows which influences the work efficiency.

In addition, the current cloud desktop system also has some running troubles. When a trouble occurs, the terminal user does not have a convenient and effective way to report the trouble or ask for help to a system management staff, at the same time, when the system management staff has important information which needs to be pushed to the terminal user, there is no simple and direct way to let the terminal user receive and know. Therefore, in the related art, if the operating system of the virtual machine is not in the running state, it cannot perform the communication with a Virtual Machine Control Center (VMC).

There is no effect solution provided in the related art for the problem that the operating system of the virtual machine cannot perform the normal communication with the virtual machine control center when it is not in the running state or it is running abnormally.

SUMMARY

The present disclosure provides a message transmission method and apparatus, which at least solves a problem of not able to perform a normal communication with a virtual machine control center when an operating system of a virtual machine is not in a running state or the operating system of the virtual machine is running abnormally in the related art.

According to one aspect of the present disclosure, a message transmission method is provided. The message transmission method includes: a virtual machine control center (VMC) establishing a link of a message transmission between the VMC and a client side, herein, the client side is used to link and operate a virtual machine; and the VMC performing the message transmission with the client side according to the established link.

Alternatively, the VMC establishing a link of a message transmission between the VMC and a client side includes at least one of: the VMC establishing a link of the message transmission between the VMC and the client side by using a Main Channel of a simple protocol for independent computing environment (SPICE) protocol according to identity (ID) information of the client side; the VMC establishing a transfer control protocol (TCP) link of the message transmission between the VMC and the client side according to identity (ID) information of the client side; or the VMC establishing a user datagram protocol (UDP) link of the message transmission between the VMC and the client side according to identity (ID) information of the client side.

Alternatively, the VMC performing the message transmission with the client side according to the established link includes: when the link is the link established by using the Main Channel of the SPICE protocol, performing at least one of: the VMC packaging a message which needs to be sent to a message in a SPICE Main Channel form and sending the packaged message to the client side, or, the VMC receiving a message, performing at least one of: in a SPICE Main Channel form, sent by the client side; when the link is the TCP link, the VMC packaging a message which needs to be sent to a message in a TCP form and sending the packaged message to the client side, or, the VMC receiving a message, in a TCP form, sent by the client side; when the link is the UDP link, performing at least one of: the VMC packaging a message which needs to be sent to a message in a UDP form and sending the packaged message to the client side, or, the VMC receiving the message, in a UDP form, sent by the client side.

According to another aspect of the present disclosure, a message transmission method is provided. The message transmission method includes: a client side performing a message transmission with a virtual machine control center (VMC) according to a link established by the VMC, herein, the client side is used to link and operate a virtual machine.

Alternatively, the link includes at least one of: a link established by using a Main Channel of a simple protocol for independent computing environment (SPICE) protocol according to identity (ID) information of the client side; a transfer control protocol (TCP) link established according to identity (ID) information of the client side; or a user datagram protocol (UDP) link established according to identity (ID) information of the client side.

Alternatively, the client side performing the message transmission with the VMC according to the link established by the VMC includes: when the link is the link established by using the Main Channel of the SPICE protocol, performing at least one of: the client side packaging a message which needs to be sent to a message in a SPICE Main Channel form and sending the packaged message to the VMC, or, the client side receiving a message, in a SPICE Main Channel form, sent by the VMC; when the link is the TCP link, performing at least one of: the client side packaging a message which needs to be sent to a message in a TCP form and sending the packaged message to the VMC, or, the client side receiving a message, in a TCP form, sent by the VMC; when the link is the UDP link, performing at least one of: the client side packaging a message which needs to be sent to a message in a UDP form and sending the packaged message to the VMC, or, the client side receiving a message, in a UDP form, sent by the VMC.

Alternatively, the client side performing a message transmission with the VMC according to the link established by the VMC includes at least one of: the client side sending a message to the VMC according to the link established by the VMC, or, the client side receiving a message sent by the VMC according to the link established by the VMC, herein, before the client side receives the message sent by the VMC according to the link established by the VMC, the method further includes: the client side reading a cache parameter used to cache the message and a presenting parameter used to present the message in the client side.

Alternatively, the cache parameter includes: a quantity size of a cache queue used to cache the message; or, the presenting parameter includes at least one of: a transparency of a message presenting layer, a size of the message presenting layer, a reminding manner of the message presenting, a presenting manner of the message, a presenting location of the message, presenting time of the message, a hiding manner of the message, or a reading manner of the message.

Alternatively, after the client side receives the message sent by the VMC according to the link established by the VMC, the method further includes: the client side caching the message according to the read cache parameter; and the client side presenting the cached message according to the read presenting parameter.

According to another aspect of the present disclosure, a message transmission apparatus is provided. The apparatus is applied in a virtual machine control center (VMC) and includes: an establishing module, configured to establish a link of a message transmission with a client side, herein, the client side is used to link and operate a virtual machine; and a transmission module, configured to perform the message transmission with the client side according to the established link.

Alternatively, the establishing module is configured to establish the link of the message transmission with the client side by at least one of following ways: establishing a link of the message transmission with the client side by using a Main Channel of a simple protocol for independent computing environment (SPICE) protocol according to identity (ID) information of the client side; establishing a transfer control protocol (TCP) link of the message transmission with the client side according to identity (ID) information of the client side; or establishing a user datagram protocol (UDP) link of the message transmission with the client side according to identity (ID) information of the client side.

Alternatively, the first transmission module is configured to: when the link is the link established by using the Main Channel of the SPICE protocol, perform at least one of: package a message which needs to be sent to a message in a SPICE Main Channel form and send the packaged message to the client side, or, receive a message, in a SPICE Main Channel form, sent by the client side; when the link is the TCP link, perform at least one of: package a message which needs to be sent to a message in a TCP form and send the packaged message to the client side, or, receive a message, in a TCP form, sent by the client side; when the link is the UDP link, perform at least one of: package a message which needs to be sent to a message in a UDP form and send the packaged message to the client side, or, receive the message, in a UDP form, sent by the client side.

According to another aspect of the present disclosure, a message transmission apparatus is provided. The apparatus is applied in a client side, and includes: a transmission module, configured to perform a message transmission with a virtual machine control center (VMC) according to a link established by the VMC, herein, the client side is used to link and operate a virtual machine.

Alternatively, the link includes at least one of: a link established by using a Main Channel of a simple protocol for independent computing environment (SPICE) protocol according to identity (ID) information of the client side; a transfer control protocol (TCP) link established according to identity (ID) information of the client side; or a user datagram protocol (UDP) link established according to identity (ID) information of the client side.

Alternatively, the second transmission module is configured to: when the link is the link established by using the Main Channel of the SPICE protocol, perform at least one of: package a message which needs to be sent to a message in a SPICE Main Channel form and send the packaged message to the VMC, or, receive a message, in a SPICE Main Channel form, sent by the VMC; when the link is the TCP link, perform at least one of: package a message which needs to be sent to a message in a TCP form and send the packaged message to the VMC, or, receive a message, in a TCP form, sent by the VMC; when the link is the UDP link, perform at least one of: package a message which needs to be sent to a message in a UDP form and send the packaged message to the VMC, or, receive a message, in a UDP form, sent by the VMC.

Alternatively, the second transmission module is configured to perform at least one of: send a message to the VMC according to the link established by the VMC, or, receive the message sent by the VMC according to the link established by the VMC; and the apparatus further includes: a reading module, configured to read a cache parameter used to cache the message and a presenting parameter used to present the message before the client side receives the message sent by the VMC according to the link established by the VMC.

Alternatively, the cache parameter includes: a quantity size of a cache queue used to cache the message; or, the presenting parameter includes at least one of: a transparency of a message presenting layer, a size of the message presenting layer, a reminding manner of the message presenting, a presenting manner of the message, a presenting location of the message, presenting time of the message, a hiding manner of the message, or a reading manner of the message.

Alternatively, the apparatus further includes: a caching module, configured to cache the message according to the read cache parameter; and a processing module, configured to present the cached message according to the read presenting parameter.

Another embodiment of the present disclosure provides a computer storage medium, the computer storage medium stores execution instructions, the execution instructions are used to execute the method in the above embodiment.

By the present disclosure, a virtual machine control center (VMC) establishes a link of a message transmission between the VMC and a client side, herein, the client side is used to link and operate a virtual machine; the VMC performs the message transmission with the client side according to the established link. It realizes the message transmission between the VMC and the client side, and the communication between the VMC and the client side is not related to the operation of the virtual operating system. It solves a problem of not able to perform a normal communication with the virtual machine control center when an operating system of a virtual machine is not in a running state or the operating system of the virtual machine is running abnormally in the related art, thereby achieving an effect of performing a normal communication with the virtual machine control center when the operating system of the virtual machine is not in the running state or the operating system of the virtual machine is running abnormally.

DETAILED DESCRIPTION

Figure 1:
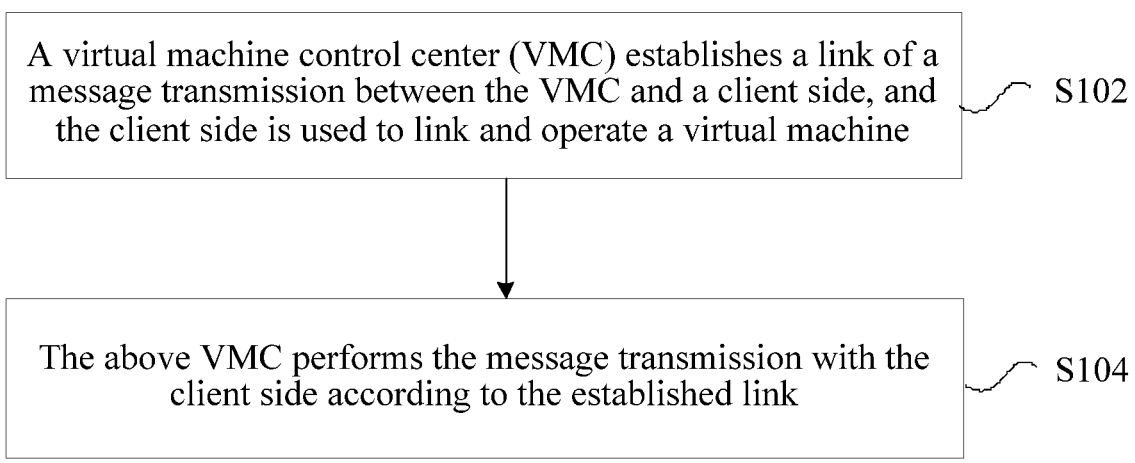
FIG. 1 is a flow chart one of a message transmission method according to an embodiment of the present disclosure.

The present disclosure will be described in detail below referring to the drawings and in combination with embodiments.

In an exemplary embodiment, the terms "first" and "second", etc., in the specifications and claims as well as the above drawings of the present disclosure are used to distinguish similar objects but not used to describe a specific order or sequence.

An embodiment provides a message transmission method. FIG. 1 is a flow chart one of a message transmission method according to an embodiment of the present disclosure. As shown in FIG. 1, the flow includes the following steps.

In step 102, a virtual machine control center (VMC) establishes a link of a message transmission between the VMC and a client side. The client side is used to link and operate a virtual machine.

In step 104, the above VMC performs the message transmission with the client side according to the established link.

By the above steps, the VMC establishes the link of the message transmission between the VMC and the client side, and the VMC performs the message transmission with the client side by using the link. The message transmission includes sending a message and receiving a message. The message transmission between different client sides can be realized by using the VMC as the intermediation. The communication between the VMC and the client side via the link can have no concern with running of the virtual operating system, thereby, it can be realized of a normal message transmission between the VMC and the client side when an operating system of a virtual machine is not running or the operating system of the virtual machine is running abnormally. It solves the problem that the operating system of the virtual machine cannot perform a normal communication with the virtual machine control center when the operating system of the virtual machine is not in a running state or the operating system of the virtual machine is running abnormally in the related art. Thus, an effect can be achieved that the operating system of the virtual machine performs the normal communication with the virtual machine control center when the operating system of the virtual machine is not in the running state or the operating system of the virtual machine is running abnormally.

The above client side may include a client side installed on a computer, and may also include a client side installed on a mobile phone. By the above embodiments it can be realized a point-to-point or broadcast interaction between a management control module (which is same as the above VMC) of a cloud desktop system and a cloud desktop client side module (i.e., the client side installed on the computer), a point-to-point or broadcast interaction between the management control module of the cloud desktop system and a mobile phone client side module (i.e., the client side installed on the mobile phone), and a point-to-point or broadcast communication system and method between the cloud desktop client side modules.

In an alternative embodiment, the above VMC establishing the link of the message transmission between the VMC and the client side includes at least one of: the VMC establishing the link of the message transmission with the client side by using a Main Channel of a Simple Protocol for Independent Computing Environment (SPICE) protocol according to identity (ID) information of the client side; the VMC establishing a Transfer Control Protocol (TCP) link of the message transmission with the client side according to the ID information of the client side; and the VMC establishing a User Datagram Protocol (UDP) link of the message transmission with the client side according to the ID information of the client side. The above types of links are examples, and the message transmission between the VMC and the client side can also be performed by establishing other types of links.

In an alternative embodiment, the above VMC performing the message transmission with the client side according to the established link includes the following steps.

When the above link is the link established by using the Main Channel of the SPICE protocol, the VMC packages a message which needs to be sent to a message in the SPICE Main Channel form, and sends the packaged message to the client side, and/or, the VMC receives a message in the SPICE Main Channel form sent by the client side.

When the link is the TCP link, the VMC packages a message which needs to be sent to a message in the TCP form and sends the packaged message to the client side, and/or, the VMC receives a message in the TCP form sent by the client side.

When the link is the UDP link, the VMC packages a message which needs to be sent to a message in the UDP form and sends the packaged message to the client side, and/or, the VMC receives a message in the UDP form sent by the client side.

Figure 2:
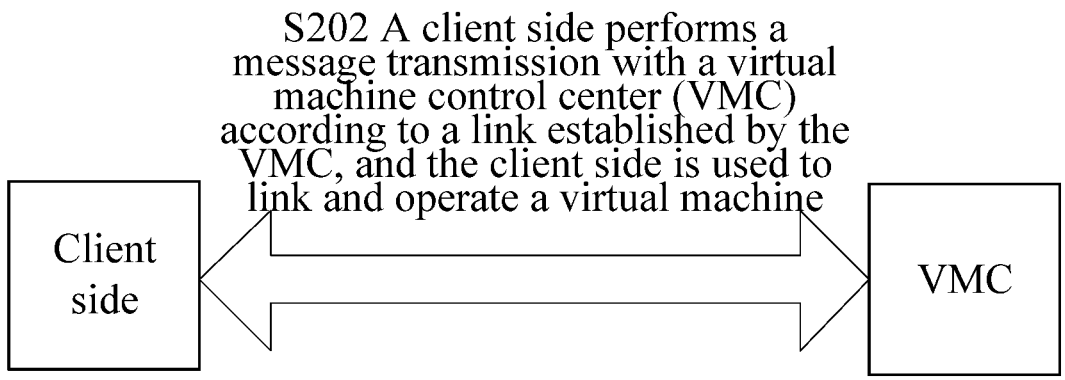
FIG. 2 is a flow chart two of a message transmission method according to an embodiment of the present disclosure.

FIG. 2 is a flow chart two of a message transmission method according to an embodiment of the present disclosure. As shown in FIG. 2, the flow includes the following steps.

In step S202, a client side performs a message transmission with a VMC according to a link established by the VMC. The client side is used to link and operate a virtual machine.

By the above step, the client side performs the message transmission with the VMC using the link established by the VMC, the link established by the VMC is used to perform a message transmission between the VMC and the client side. The communication via the link between the client side and the VMC can have no concern with running of the virtual operating system, thereby, it can still realize a message transmission between the client side and the VMC in the case that the virtual operating system is not running. It solves the problem that the operating system of the virtual machine cannot perform a normal communication with the virtual machine control center when the operating system of the virtual machine is not in a running state or the operating system of the virtual machine is running abnormally in the related art. Thus, an effect can be achieved that the operating system of the virtual machine performs the normal communication with the virtual machine control center when the operating system of the virtual machine is not in the running state or the operating system of the virtual machine is running abnormally.

In an alternative embodiment, the above link includes at least one of: a link established by using a Main Channel of a SPICE protocol according to ID information of the client side; a TCP link established according to the ID information of the client side; and a UDP link established according to the ID information of the client side.

In an alternative embodiment, the above client side performing the message transmission with the VMC according to the link established by the VMC includes the following steps.

When the link is the link established by using the Main Channel of the SPICE protocol, the client side packages a message which needs to be sent to a message in the SPICE Main Channel form and sends the packaged message to the VMC, and/or, the client side receives a message in the SPICE Main Channel form sent by the VMC.

When the link is the TCP link, the client side packages a message which needs to be sent to a message in the TCP form and sends the packaged message to the VMC, and/or, the client side receives a message in the TCP form sent by the VMC.

When the link is the UDP link, the client side packages a message which needs to be sent to a message in the UDP form and sends the packaged message to the VMC, and/or, the client side receives a message in the UDP form sent by the VMC.

In an alternative embodiment, the above client side performing the message transmission with the VMC according to the link established by the VMC includes: the above client side sending a message to the VMC according to the link established by the VMC, and/or, the client side receiving a message sent by the VMC according to the link established by the VMC. Before the client side receives the message sent by the VMC according to the link established by the VMC, the method further includes the step that: the client side reads a cache parameter used to cache the message and a presenting parameter used to present the message in the client side. Thereby, the received message can be cached and presented according to the cache parameter and the presenting parameter.

In an alternative embodiment, the above cache parameter includes: a quantity size of a cache queue used to cache the message; and/or, the presenting parameter includes at least one of: a transparency of a message presenting layer, a size of the message presenting layer, a reminding manner of the message presenting, a presenting manner of the message, a presenting location of the message, presenting time of the message, a hiding manner of the message, and a reading manner of the message. Below the specific content of the above presenting parameters are illustrated by examples. The transparency of the message presenting layer may be set to 70%, 80% or other transparency, setting the transparency of the message presenting layer can ensure coexisting of the message presenting layer and an interface required to be presented by the terminal itself, so that both will not influence each other. The size of the message presenting layer may include that the message presenting layer is as large as the terminal interface, or the message presenting layer takes up a part of the terminal interface, herein, the message presenting layer may also be divided into regions. The reminding manner of the message presenting may include alerting by flickering in a window toolbar when there is an unread message. The presenting manner of the message may include presenting the message in the order from an upper right corner to a lower left corner, or presenting the message in the order from left to right, or presenting the message in the order from the lower left corner to the upper right corner, and so on, and different messages may be presented in accordance with different presenting manners. The presenting location of the message may include displaying a specific location of the message, such as may include presenting at a position of the middle of the terminal interface, or presenting at a position of the upper half of the terminal interface, or presenting at a position without arranging an icon on the terminal interface, and so on. The presenting time of the message may include the time from start to display the message to the message disappearing, also may include a time interval of presenting between the different messages (e.g., displaying, 3 s after a first message disappears, a second message), and may also include the time from start to display the message presenting layer to the message presenting layer disappearing. The hiding manner of the message may include how to hide the message after presenting the message, such as, the hiding manner may be hiding by flying out, or hiding by melting, or hiding by other manners. The reading manner of the message includes how to read the message after receiving the message, such as, the reading manner may include reading the message by receiving a clicking signal, or reading the message by entering a predetermined command, and so on.

In an alternative embodiment, after the above client side receiving the message sent by the VMC according to the link established by the VMC, the method further includes that: the client side caches the message according to the read cache parameter; and the client side presents the cached message according to the read presenting parameter.

Through the description of the above embodiments, one person skilled in the art can clearly understand the methods of the above embodiments can be realized by a manner of using software adding a necessary general hardware platform, of course, they can also be realized through the hardware, but in many cases, the former is a preferred embodiment. Based on this understanding, the technical scheme of the present disclosure substantially or a part of contributing to the related art may be embodied in the form of a software product. The computer software product may be stored in a storage medium (such as, a ROM/RAM, a disk, or a CD), and may include several instructions to make a terminal device (which may be a mobile phone, a computer, a server, or a network device, etc.) to execute the methods of the various embodiments of the present disclosure.

An embodiment provides a message transmission apparatus, which is used to realize the above-mentioned embodiments and the alternative embodiments, and will not explain more for those which have already been explained. The term "module" used below may be a combination of software and/or hardware for realizing predetermined functions. Although the apparatus described in the following embodiments may be realized by software alternatively, an implementation of the hardware, or a combination of software and hardware, may be also possible and conceived.

Figure 3:
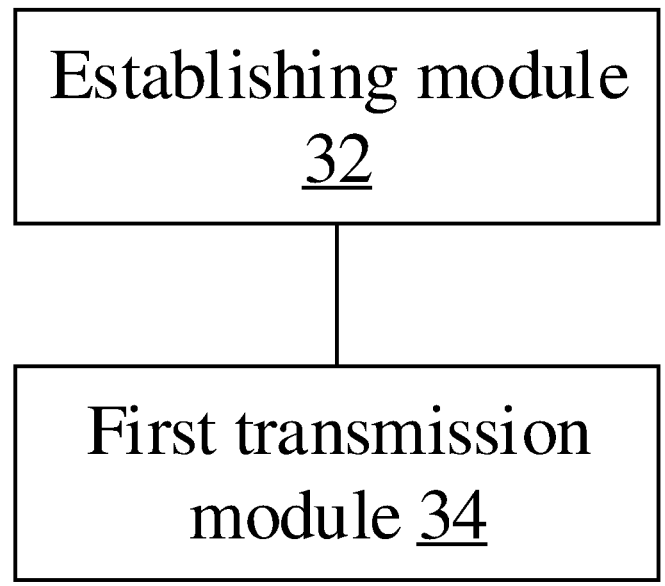
FIG. 3 is a structural block diagram one of a message transmission apparatus according to an embodiment of the present disclosure.

FIG. 3 is a structural block diagram one of a message transmission apparatus according to an embodiment of the present disclosure. The apparatus may be applied in a virtual machine control center (VMC). As shown in FIG. 3, the apparatus includes an establishing module 32 and a first transmission module 34, and the apparatus may be described as follows.

The establishing module 32 is configured to establish a link of a message transmission with a client side, herein, the client side is used to link and operate a virtual machine. The first transmission module 34 is connected to the above establishing module 32, and is configured to perform the message transmission with the client side according to the above established link.

In an alternative embodiment, the above establishing module 32 may include at least one: establishing a link of the message transmission with the client side by using a Main Channel of a SPICE protocol according to ID information of the client side; establishing a transfer control protocol (TCP) link of the message transmission with the client side according to the ID information of the client side; and establishing a user datagram protocol (UDP) link of the message transmission with the client side according to the ID information of the client side.

In an alternative embodiment, the above first transmission module 34 is configured to: when the above link is the link established by using the Main Channel of the SPICE protocol, package a message which needs to be sent to a message in a SPICE Main Channel form and send the packaged message to the client side, and/or, receive a message, in a SPICE Main Channel form, sent by the client side; when the link is the TCP link, package a message which needs to be sent to a message in a TCP form and send the packaged message to the client side, and/or, receive a message, in a TCP form, sent by the client side; and when the link is the UDP link, package a message which needs to be sent to a message in a UDP form and send the packaged message to the client side, and/or, receive the message, in a UDP form, sent by the client side.

Figure 4:
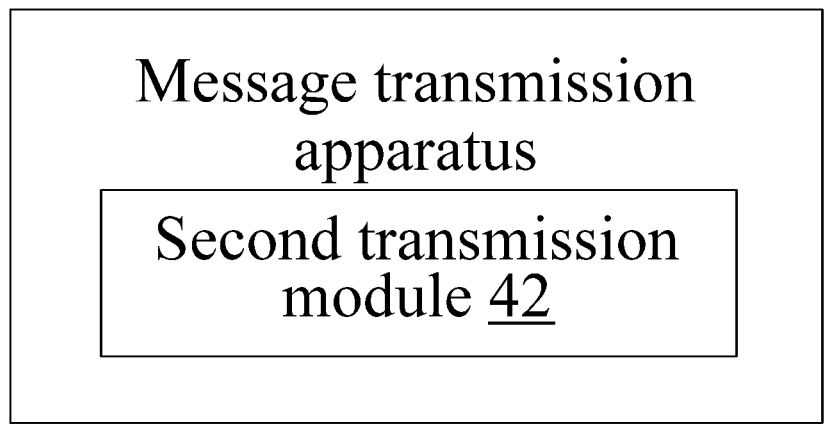
FIG. 4 is a structural block diagram two of a message transmission apparatus according to an embodiment of the present disclosure.

FIG. 4 is a structural block diagram two of a message transmission apparatus according to an embodiment of the present disclosure. The apparatus may be applied in a client side. As shown in FIG. 4, the apparatus may include a second transmission module 42, and the apparatus may be described below.

The second transmission module 42 is configured to perform a message transmission with a virtual machine control center (VMC) according to a link established by the VMC, herein, the client side is used to link and operate a virtual machine.

In an alternative embodiment, the above link includes at least one of: a link established by using a Main Channel of a SPICE protocol according to ID information of the client side; a TCP link established according to the ID information of the client side; and a UDP link established according to the ID information of the client side.

In an alternative embodiment, the above second transmission module 42 is configured to: when the link is the link established by using the Main Channel of the SPICE protocol, package a message which needs to be sent to a message in a SPICE Main Channel form and send the packaged message to the VMC, and/or, receive a message, in a SPICE Main Channel form, sent by the VMC; when the link is the TCP link, package a message which needs to be sent to a message in a TCP form and send the packaged message to the VMC, and/or, receive a message, in a TCP form, sent by the VMC; and when the link is the UDP link, package a message which needs to be sent to a message in a UDP form and send the packaged message to the VMC, and/or, receive a message, in a UDP form, sent by the VMC.

Figure 5:
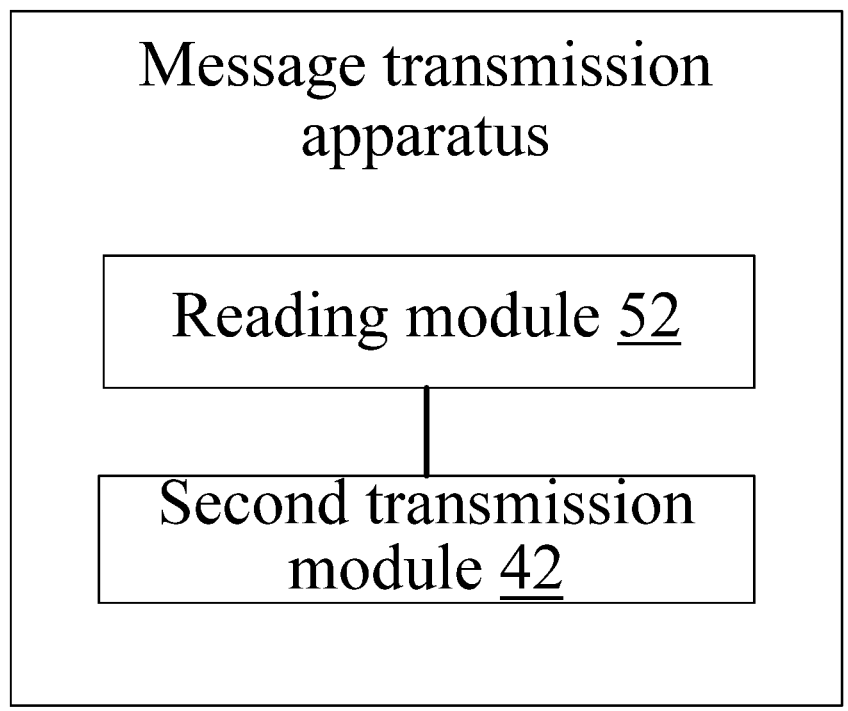
FIG. 5 is an alternative structural block diagram one of a message transmission apparatus according to an embodiment of the present disclosure.

In an alternative embodiment, the above second transmission module 42 is configured to: send a message to the VMC according to the link established by the VMC, or, receive the message sent by the VMC according to the link established by the VMC. FIG. 5 is an alternative structural block diagram one of a message transmission apparatus according to an embodiment of the present disclosure. As shown in FIG. 5, besides all the modules shown in FIG. 4, the apparatus may further include: a reading module 52, and the apparatus may be described below.

The reading module 52 is connected to the above second transmission module 42, and is configured to read a cache parameter used to cache the message and a presenting parameter used to present the message before receiving the message sent by the VMC according to the link established by the VMC.

In an alternative embodiment, the above cache parameter includes: a quantity size of a cache queue used to cache the message; and/or, the above presenting parameter includes at least one of: a transparency of a message presenting layer, a size of the message presenting layer, a reminding manner of the message presenting, a presenting manner of the message, a presenting location of the message, presenting time of the message, a hiding manner of the message, and a reading manner of the message.

Figure 6:
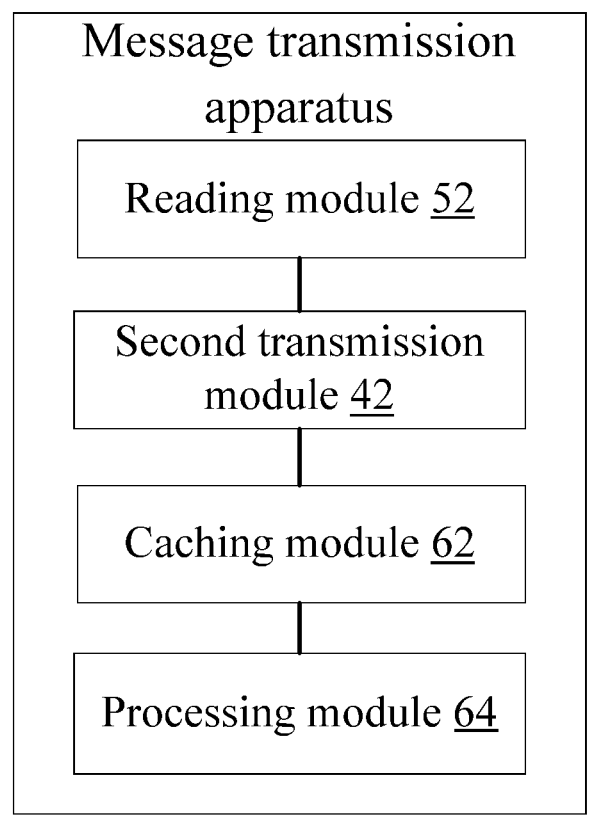
FIG. 6 is an alternative structural block diagram two of a message transmission apparatus according to an embodiment of the present disclosure.

FIG. 6 is an alternative structural block diagram two of a message transmission apparatus according to an embodiment of the present disclosure. As shown in FIG. 6, besides all the modules shown in FIG. 5, the apparatus may further include: a caching module 62 and a processing module 64, and the apparatus is described in the following.

The caching module 62 is connected to the above second transmission module 42, and is configured to cache the message according to the read cache parameter. The processing module 64 is configured to present the cached message according to the read presenting parameter.

Through the above embodiments, in order to solve the problems existed in the related art, the embodiments of the present disclosure may use the module architecture, which includes a virtual machine control center (VMC), a virtual machine running host (HOST), a virtual machine link terminal (CLIENT) and the already existed data links in the architecture, already existed in the cloud desktop system (i.e., the virtual machine operating system), and may use an information sending module (corresponding to the above first transmission module 34 and the second transmission module 42), an information receiving module (corresponding to the above first transmission module 34 and the second transmission module 42) and an information presenting and processing module (corresponding to the above reading module 52, the caching module 62 and the processing module 64) added based on the architecture.

The solution of the present disclosure will continue to be described below in combination with embodiments. In an exemplary embodiment, the "information" contained in the following may be the information carried in the above "message".

The embodiments of the present disclosure provides, based on the cloud desktop system, a system of communication between a management control side (corresponding to the above VMC) and a cloud desktop client (corresponding to the above client side) and a system of communication between the cloud desktop client sides. The system may include a management control side transceiver module (corresponding to the above first transmission module 34), a client side transceiver module (corresponding to the above second transmission module 42) and an information presenting and processing module (corresponding to the above reading module 52, caching module 62 and processing module 64). Each module will be described as follows.

The management control side transceiver module serves as an information processing side for the communication between the management control side and the cloud desktop client side, and is responsible for collecting communication information of an administrator and sending to any client side or all the client sides which the control side can perceive.

The client side transceiver module is responsible for receiving and sending messages between the management control side and the client side, and receiving and sending messages between the client sides.

The information presenting and processing module serves as a final presenting module for information processing and is an important function module of the system. The information presenting and processing module is responsible for parsing an information packet which may include information after compression, coding or encryption. The information presenting and processing module is responsible for distribution of information types, which may assign different information types to the corresponding information processor or processing function for processing. The information presenting and processing module is responsible for presenting the information including text, audio, video, etc., on the terminal.

Figure 7:
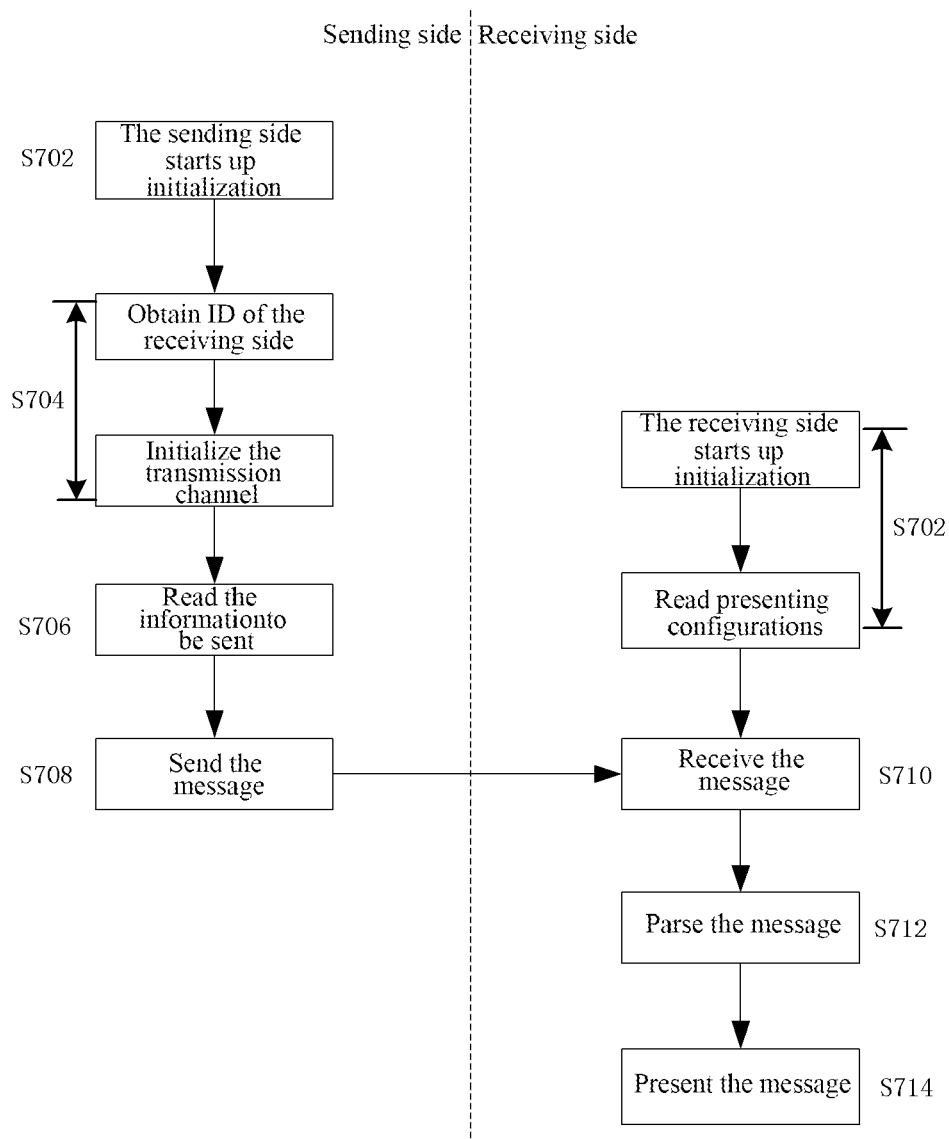
FIG. 7 is a flow chart of a management data display logic according to an embodiment of the present disclosure.

Referring to FIG. 7, it shows a logical process of a sending side (i.e., the above VMC) editing a message data and sending the message data to a receiving side (i.e., the above client side) and of the receiving side presenting information. FIG. 7 is a flow chart of a management data display logic according to an embodiment of the present disclosure. As shown in FIG. 7, the process may include the following steps.

In S702, the sending side initializes a sending module of management control side transceiver module when the sending side starts up, at the same time, the receiving side initializes a receiving module of the client side transceiver module, a parsing module for parsing the message data and an information presenting and processing module of the client side. The client side may read related configurations when initializing, and the related configurations may include the size of the caching queue of receiving the message, the transparency of the message presenting layer, the scrollable direction when the message displays, the time of message disappearing automatically after the message displays, or the position in the window when the message displays. The position may be the top, the bottom, the left side or the right side, etc.

In S704, the sending side establishes a communication link according to a unique ID information of a specified receiving side. The communication link may establish with the aid of a Main Channel of the SPICE protocol, besides that, may also establish a TCP link or a UDP link directly with the receiving side of the corresponding ID.

In S706, the sending side reads the message data to be sent by the sending side, which may directly edit the information, and may also read a stored file. The message content may be text information, image information and video information, etc.

In S708, the sending side packages the information read in the previous step into a message of the Spice Main Channel, or sends directly as the TCP data package or UCP data package and sends to the receiving side.

In S710, a receiving module of the client side transceiver module of the receiving side may wait the message of the sending side based on an event mechanism; the receiving module triggers the receiving event after the message arrives at the receiving side, then the receiving event calls the parsing module to read and parse the message. If the receiving module of the receiving side is based on the TCP or the link, the receiving module monitors a specified port, and the receiving module calls the corresponding logical processing when there is a message sent from the sending side.

In S712, the receiving module of the receiving side forwards the message to the parsing module; the parsing module removes data such as a message header which have no relation with the information, restores the data to the corresponding information form via operations of uncompressing and decoding, etc., according to the message type carried by the data packet: text, image, video or audio, etc., and stores an index of the message into the information cache, and waits for reading by the information presenting and processing module.

In S714, the information presenting and processing module is called for processing after the parsing module has completed the process and restored the message to text or images or video data. The information presenting and processing module displays information according to the presenting configurations read by the receiving side when initializing. For example, the information presenting and processing module reads the text information out in turn from the information cache in an order from a upper right corner to a lower right corner, and displays the profile information on the right side of a window layer, and automatically hides the message after timeout 3 seconds; for the picture information, displays the window layer in the middle, and displays by 80% transparency setting in the presenting configuration, and automatically hides the layer information after timeout 5 seconds, and then if there are several pieces of picture information, the next picture continues to be displayed after hiding the previous picture; for the audio information, displays a playback control bar and an audio type prompt in the center of the layer, plays the audio when the user clicks the playback control, and automatically hides the message prompt after timeout 3 seconds. The information such as the above text, picture, video or audio may also be checked by clicking on unread information in a windows toolbar when timeout.

The above information communication data flow may include the following directions: the information that the management control side sends to the cloud desktop client side; the information that the cloud desktop client side sends to the management control side; the information that the cloud desktop client sides send to each other.

The above point-to-point or broadcast communication may include the following forms: information communication in the form of text; information communication in the form of voice; information communication in the form of video; information communication in a combination form of text, voice and video.

The presenting mode of the above communication information may include the following forms: displaying in the form of the layer which has transparency properties in the cloud desktop client side window; displaying by an audio device in the cloud desktop client side terminal.

The above layer presenting mode may include: a layer with a transparency entirely covering on the client side window; an image related to a remote protocol of the client side and the communication information displaying in parallel in the different Z order layers; a layer with a transparency partly floating on the client side window, in which the layer may float on a position such as the top, the bottom, the left side, the right side, or the middle of the client side window.

The above layer may be terminated to be presented, and the termination mode may include: automatically disappearing when arrives at the specified time; turning off the layer personally; the layer information floating past in one direction or disappearing after rotating;

The triggering mode of displaying the above audio device includes: automatically playing when the information arrives; prompting the user to play when the information arrives.

In an exemplary embodiment, the sending module of the above virtual machine management control side may be implemented mixed with the VMC, and may also be implemented in the host of the virtual machine, its effects are the same, and its functions are to identify the terminal virtual machine and then send or receive information.

The information presentation of the terminal client side may be implemented by a mode of layers based on the client side program, or may be processed by a mode of processing in a virtual machine display channel, and its function is displaying the communicate information and the surface picture of the virtual machine in parallel.

The present disclosure will be described below in combination with the embodiments.

Embodiment One

Figure 8:
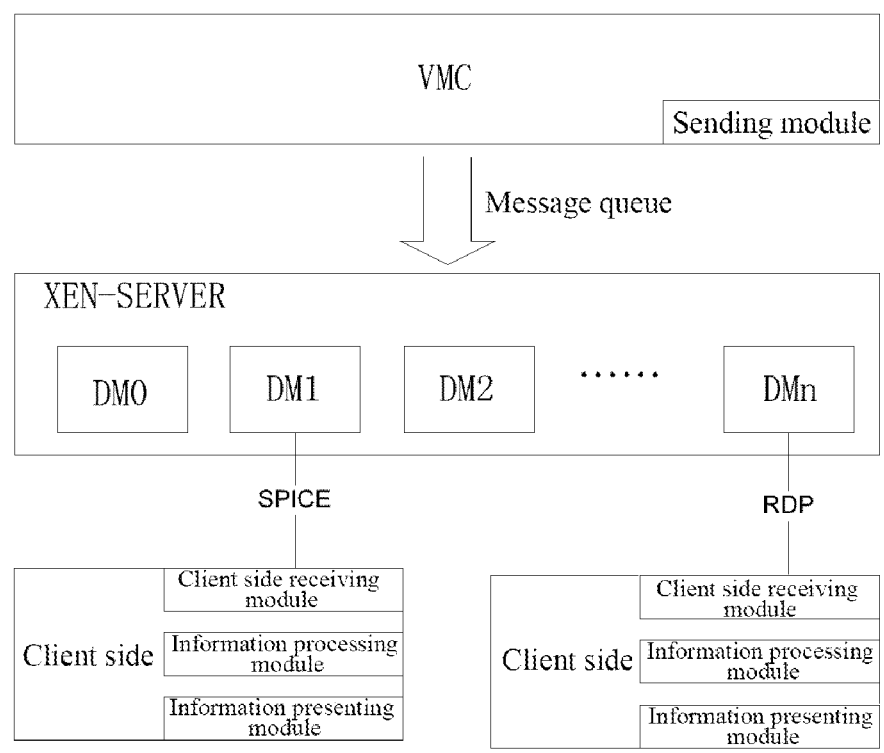
FIG. 8 is a schematic diagram of a one-way communication from a management control side to a PC client side according to an embodiment of the present disclosure.

FIG. 8 is a schematic diagram of a one-way communication from a management control side to a PC client side according to an embodiment of the present disclosure. As shown in FIG. 8, the management control side communicating with the PC client side in a one-way direction can be implemented based on an architecture of XEN virtualization.

The system includes a management control side sending module, a client side receiving module, an information processing module and an information presenting module (corresponding to the above processing module 64).

The management control side sending module is configured to send text information which is used for notifying a Personal Computer (PC) terminal user to upgrade, and, send in the virtual machine control side to the client side receiving module to process through a message queue, a remote link protocol SPICE channel message link.

The above client side receiving module delivers the link information to the information processing module after receiving the link information, and the information processing module identifies a source and a type of the information. The type refers to whether the information is the text information or the information such as pictures, audio or video, etc. In the embodiment, the type of the information refers to the text information. The information processing module accordingly performs creation and distribution of the corresponding resources, and the resources may include a caching area, a timer for text hiding or showing, etc., of each piece of information.

The above information presenting module presents the information parsed by the information processing module. The transparent or semi-transparent layer which has the same width with the current displaying interface window is half covered at the top of the window, the text information floats from the right side of the layer to the left side of the layer at constant speed, the text information disappears after repeating 3 times, and then the layer is hid and disappeared. A timer controls time of repeatedly displaying the above text and a time interval of displaying, and the rolling speed is corresponding to the time interval of the timer when the text scrolls to display. Of course, the presenting manner is just an example and it can be presented in other presenting manners.

After scrolling to display, the above text may disappear automatically according to the configuration when the client side initializes. The above text may also disappear after it is confirmed by the user. If it is confirmed by the user, the information unconfirmed by the user will be hidden temporarily after the time specified by the timer is up and an icon-type reminder will be given to the user, and the unconfirmed information can be redisplayed after the user clicks on the icon.

The above flow completes one procedure of sending the information from the management control side to the PC client side to presentation.

Embodiment Two

FIG. 8 may also be indicated as the one-way communication from the management control side to a mobile client side implementing based on an architecture of XEN virtualization.

The system includes a management control side sending module, a mobile client side receiving module, an information processing module and an information presenting module (corresponding to the above processing module 64).

The management control side sending module is configured to send text information which is used for notifying a mobile client side user to upgrade, and send in the virtual machine control side to the mobile client side receiving module to process through a message queue, a remote link protocol SPICE channel message link.

The above mobile client side receiving module delivers the link information to the information processing module after receiving the link information, the information processing module identifies a source and a type of the information. The type refers to whether the information is the text information or the information such as pictures, audio or video, etc. In the embodiment, the type of the information refers to the text information. The information processing module accordingly performs creation and distribution of the corresponding resources, and the resources may include a caching area, a timer for text hiding or showing, etc., of each piece of information.

The above information presenting module presents the information parsed by the information processing module. The transparent or semi-transparent layer which has the same width with the current displaying interface window is half covered at the top of the window, the text information floats from the right side of the layer to the left side of the layer at constant speed, the text information disappears after repeating 3 times, and then the layer is hid and disappeared. A timer controls time of repeatedly displaying the above text and a time interval of displaying, and a rolling speed is corresponding to the time interval of the timer when the text scrolls to display. Of course, the presenting manner is just an example and it can be presented in other presenting manners.

After scrolling to display, the above text may disappear automatically according to the configuration when the client side initializes. The above text may also disappear after it is confirmed by the user. If it is confirmed by the user, the information unconfirmed by the user will be hidden temporarily after the time specified by the timer is up and an icon-type reminder will be given to the user, and the unconfirmed information can be redisplayed after the user clicks on the icon.

A vibration function of the mobile terminal may be started up to prompt the user after the above information arrives at the mobile client side. When there is information unconfirmed by the user, a breathing light of the terminal may be activated and a notification message is displayed in a task bar.

The above flow completes one procedure of sending the information from the management control side to the mobile client side to presentation.

Embodiment Three

Figure 9:
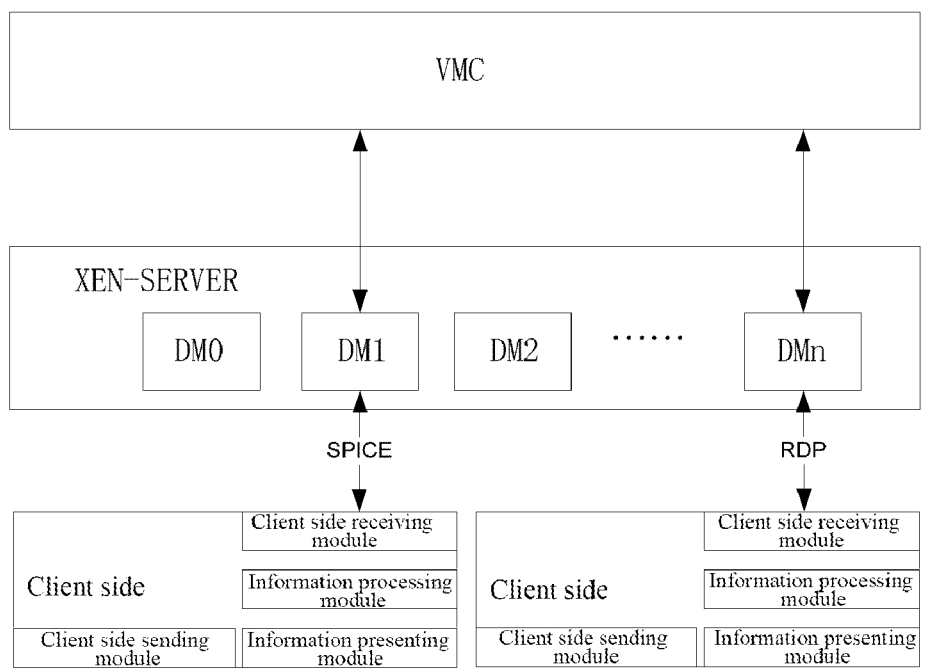
FIG. 9 is a schematic diagram of a two-way communication display between a PC client side and a mobile client side according to an embodiment of the present disclosure.

FIG. 9 is a schematic diagram of a two-way communication display between a PC client side and a mobile client side according to an embodiment of the present disclosure. The embodiment may be illustrated in combination with FIG. 9 below.

The embodiment is mainly used to describe that the sending module used for sending information is not only limited in the control side, but also can be set in the client side. After putting the sending module respectively in different client sides, the information sending and receiving between the client sides can be realized, and the information sending from the client side to the management control side may also be included.

In the embodiment, the PC client side includes a client side sending module, a client side receiving module, an information processing module and an information presenting module. The PC client side sending module first sends information to the management control side after editing or reading the information carried in the message, and then the management control side routes the information to a destination client side.

The client side receiving module of the destination client side delivers the link information to the information processing module after receiving the link information. The information processing module identifies the source and the type of the information, and the type refers to whether the information is text information or information such as pictures, audio or video, etc. In the present embodiment, the type of the information refers to the text information. The information processing module accordingly performs creation and distribution of the corresponding resources, and the resources may include a caching area, a timer for text hiding or showing, etc., of each piece of information.

After scrolling to display, the above text may disappear automatically according to the configuration when the client side initializes. The above text may also disappear after it is confirmed by the user. If it is confirmed by the user, the information unconfirmed by the user will be hidden temporarily after the time specified by the timer is up and an icon-type reminder will be given to the user, and the unconfirmed information can be redisplayed after the user clicks on the icon.

A vibration function of the destination terminal may be started up to prompt the user after the above information arrives at the destination client side. When there is information unconfirmed by the user, a breathing light of the terminal may be activated and a notification message is displayed in a task bar.

The above flow completes one procedure of sending the information from the PC client side to the destination client side to presentation.

Embodiment Four

In this embodiment, a present manner of information is mainly described.

Figure 10:
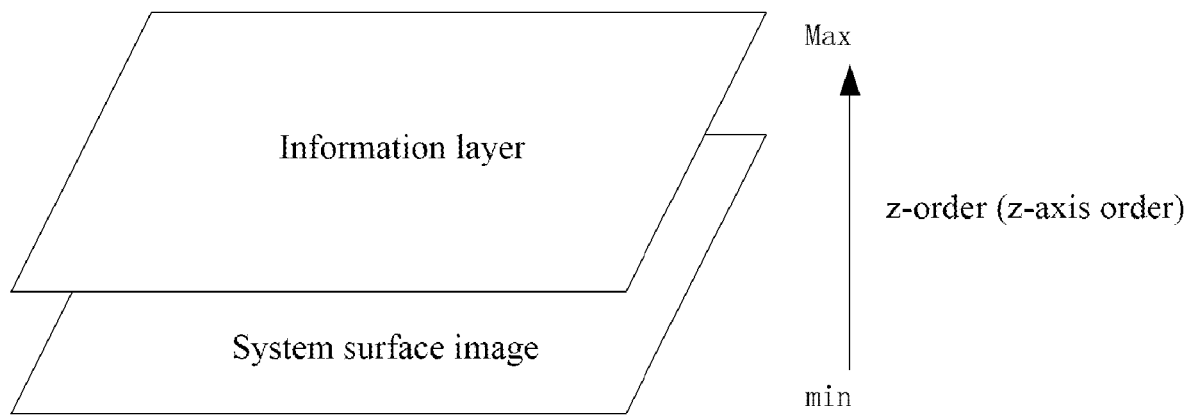
FIG. 10 is a schematic diagram one of a presenting layer of information according to an embodiment of the present disclosure.

FIG. 10 is a schematic diagram one of a presenting layer of the information according to an embodiment of the present disclosure. As shown in FIG. 10, the information may be picture information or video information, the information presenting module creates a fully covered semi-transparent layer on the window of the client side, and the information presenting procedure does not affect remote image displaying of the virtual machine in the window of the client side. Thus, the user can know the communication information while the user operates the cloud desktop virtual machine, and the layer disappears after fulfilling the displaying or playing the information.

Figure 11:
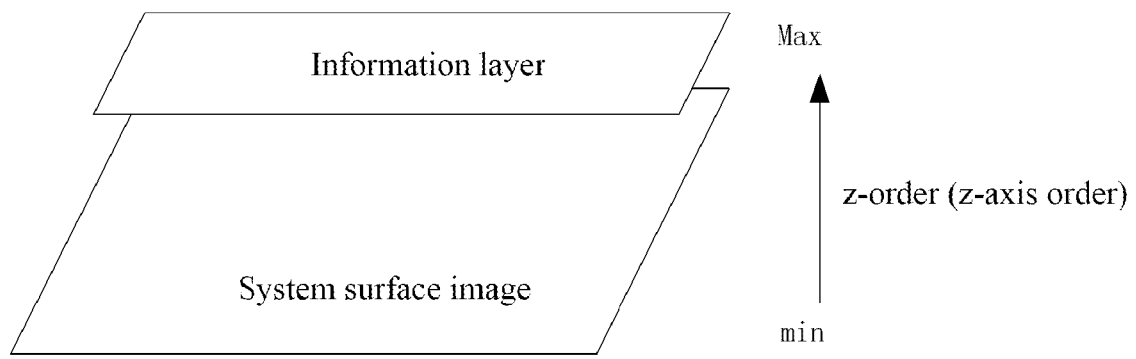
FIG. 11 is a schematic diagram two of a presenting layer of information according to an embodiment of the present disclosure.

FIG. 11 is a schematic diagram two of a presenting layer of the information according to an embodiment of the present disclosure. As shown in FIG. 11, the information may be text information, the information presenting module creates a half covered semi-transparent layer on the window of the client side, the information presenting procedure does not affect the remote image displaying of the virtual machine in the window of the client side. The user can know the communication information while the user operates the cloud desktop virtual machine, and the layer disappears after fulfilling the displaying or playing the information.

As is known to all, in the related art, when a virtual machine is connected and logged by using the virtual client side, there are several seconds for waiting, during the time, the screen of the client side either is a black screen with no interactive prompt, or is a static constant prompt information, however effective, easy to use and extendable interactive communication mode is lacked between the cloud desktop management control side and cloud desktop client side. Through the scheme of the above embodiments of the present disclosure, because a link of the message transmission is established between the control side and the client side, so the interaction of information between the management control side and the client side can be performed in the waiting time, which increases the diversity of interaction.

At the same time, relative to the related art, the method and the apparatus in the embodiments of the present disclosure have made a breakthrough progress, the method and the apparatus add communication channels between the cloud desktop virtual machine administrator and the cloud desktop terminal users, at the same time, put forward a novel information displaying method, thereby improving the use experience of the terminal user, ensuring that the system administrators and terminal users can obtain meaningful information with each other, and seamlessly integrating with the existing systems.

The embodiment of the present disclosure overcomes a defect that in the related art the cloud desktop system performs the instant information communication still based on software installed inside the operating system, it can realize information communication between the administrators and terminal users of the cloud desktop virtual machine, with no need of the operating system of the cloud desktop virtual machine being in the running state and no need of installing a special communication software on the operating system of the cloud desktop virtual machine.

Through the embodiments of the present disclosure, since the information communication is no longer dependent on the running state in which the cloud desktop virtual machine operating system is, on the one hand, it reduces the resources of a Central Processing Unit (CPU), memory, etc., of the cloud desktop virtual operating system taken up by the communication software, on the other hand, it solves the problems that the window interface of the communication software takes up screen displaying area and the user needs to perform an appropriate adjustment to the size or to the window hiding or showing with other windows which need to display, which makes the communication interface display with other windows in parallel.

The embodiments of the present disclosure can effectively solve the problem that the terminal user cannot report to the system administrator in time when an operation failure of the current cloud desktop virtual machine system occurs. It makes the terminal user can effectively describe the failure problem to the system administrator, at the same time, it the system administrator also can let the terminal user directly receive and percept when the system administrator has important information needed to be pushed to the terminal user. It solves the problem that there will be a black screen for several seconds with no interactive prompt, or be static constant prompt information when the terminal user connects and logs in the virtual machine by the cloud desktop virtual machine client side, which makes the management side of the cloud desktop virtual machine and the client side of the cloud desktop virtual machine have the effective, easy to use and extendable interactive communication mode, and can make use of the link time period of the black screen time to push valuable information to the terminal users.

It also can realize that the mobile terminal is able to perform the information interaction with the cloud desktop management side, the management side can send/push information such as weather, an advertisement, a login state, performance and so on to the terminal users, the mobile terminal users may report information about a position or a fault light to the cloud desktop management side.

In an exemplary embodiment, the above various modules can be realized through software or hardware, for the latter, it can be realized through the following manner, but not limited to: the above modules being located at the same processor; or, the above modules being located at multiple processors respectively.

An embodiment of the present disclosure further provides a storage medium. Alternatively, in the embodiment, the above storage medium may be configured to store program codes which are used to execute the following steps:

In S1, the virtual machine control center (VMC) establishes a link of a message transmission between the VMC and a client side, herein, the client side is used to link and operate the virtual machine;

In S2, the above VMC performs the message transmission between the VMC and the client side according to the established link.

Alternatively, the storage medium is further configured to store program codes which are used to perform the following steps:

In S1, the client side performs the message transmission between the client side and the virtual machine control center (VMC) according to the link established by the VMC, herein, the client side is used to link and operate the virtual machine.

Alternatively, in the embodiment, the above storage medium may include but not limited to: U disk, Read-Only Memory (ROM), Random Access Memory (RAM), mobile hard disk, disk or CD, and other medium which can store the program codes.

Alternatively, the specific examples in this embodiment can refer to the above embodiments and the examples described in the alternative embodiments, and they will be no longer described in this embodiment here.

The ordinary person skilled in the art should understand that each module or each step of the present disclosure can be implemented by using a universal computing apparatus, they can be integrated on a single computing apparatus, or distributed in the network composed by multiple computing apparatuses; alternatively, they can be implemented by using executable program code of the computing apparatus, thereby, they can be stored in a storage apparatus and be executed by the computing apparatus. In some cases, the shown or described steps can be executed in another order which is different from the order described here, or they can be respectively made into various integrated circuit modules, or multiple modules or steps of them can be made into a single integrated circuit module. Thus, the present disclosure is not limited to any particular combination of hardware and software.

The above description is only alternative embodiments of the present disclosure, and is not intended to limit the present disclosure. For an ordinary person skilled in the art, the present disclosure can have various changes and variations. Any modifications, equivalent substitutions and improvements made within the essence and principle of the present disclosure should be included in the protection scope of the present disclosure.

The above description is only alternative embodiments of the present invention, and is not intended to limit the present invention. For an ordinary person skilled in the art, the present invention can have various changes and variations. Any modifications, equivalent substitutions and improvements made within the essence and principle of the present invention should be included in the protection scope of the present invention.

INDUSTRIAL APPLICABILITY

As mentioned above, the embodiments of the present disclosure provide a message transmission method and apparatus, which have the following beneficial effects: it solves the problem of not performing the normal communication with the virtual machine control center when the operating system of the virtual machine is not in a running state or the operating system of the virtual machine is running abnormally in the related art, thereby achieving an effect of performing communication with the virtual machine control center when the operating system of the virtual machine is not in the running state.

What I claim is:

1. A message transmission method, comprising:
establishing, by a virtual machine control center (VMC), a link of a message transmission between the VMC and a client side, wherein, the client side is used to link and operate a virtual machine; and
performing, by the VMC, the message transmission with the client side according to the established link;
wherein establishing, by the VMC, the link of the message transmission between the VMC and the client side comprises at least one of:
establishing, by the VMC, the link of the message transmission between the VMC and the client side by using a Main Channel of a simple protocol for independent computing environment (SPICE) protocol according to identity (ID) information of the client side;
establishing, by the VMC, a transfer control protocol (TCP) link of the message transmission between the VMC and the client side according to identity (ID) information of the client side; or
establishing, by the VMC, a user datagram protocol (UDP) link of the message transmission between the VMC and the client side according to identity (ID) information of the client side;
wherein performing, by the VMC, the message transmission with the client side according to the established link comprises:
when the link is established by using the Main Channel of the SPICE protocol, performing at least one of: packaging, by the VMC, a message to be sent to a message in a SPICE Main Channel form and sending the packaged message to the client side, or, receiving, by the VMC, a message, in a SPICE Main Channel form, sent by the client side;
when the link is the TCP link, performing at least one of: packaging, by the VMC, a message to be sent to a message in a TCP form and sending the packaged message to the client side, or, receiving, by the VMC, a message, in a TCP form, sent by the client side; and
when the link is the UDP link, performing at least one of: packaging, by the VMC, a message to be sent to a message in a UDP form and sending the packaged message to the client side, or, receiving, by the VMC, the message, in a UDP form, sent by the client side.

2. A message transmission method, comprising:
performing, by a client side, a message transmission with a virtual machine control center (VMC) according to a link established by the VMC, wherein, the client side is used to link and operate a virtual machine;
wherein the link comprises at least one of:
a link established by using a Main Channel of a simple protocol for independent computing environment (SPICE) protocol according to identity (ID) information of the client side;
a transfer control protocol (TCP) link established according to identity (ID) information of the client side; or
a user datagram protocol (UDP) link established according to identity (ID) information of the client side;
wherein performing, by the client side, the message transmission with the VMC according to the link established by the VMC comprises:
when the link is established by using the Main Channel of the SPICE protocol, performing at least one of: packaging, by the client side, a message to be sent to a message in a SPICE Main Channel form and sending the packaged message to the VMC, or, receiving, by the client side, a message, in a SPICE Main Channel form, sent by the VMC;
when the link is the TCP link, performing at least one of: packaging, by the client side, a message to be sent to a message in a TCP form and sending the packaged message to the VMC, or, receiving, by the client side, a message, in a TCP form, sent by the VMC; and
when the link is the UDP link, performing at least one of: packaging, by the client side, a message to be sent to a message in a UDP form and sending the packaged message to the VMC, or, receiving, by the client side, a message, in a UDP form, sent by the VMC.

3. The method according to claim 2, wherein performing, by the client side, a message transmission with the VMC according to the link established by the VMC comprises at least one of: sending, by the client side, a message to the VMC according to the link established by the VMC, or, receiving, by the client side, a message sent by the VMC according to the link established by the VMC,
wherein, before the client side receives the message sent by the VMC according to the link established by the VMC, the method further comprises: reading, by the client side, a cache parameter used to cache the message and a presenting parameter used to present the message in the client side.

4. The method according to claim 3, wherein:
the cache parameter comprises: a quantity size of a cache queue used to cache the message; or,
the presenting parameter comprises at least one of: a transparency of a message presenting layer, a size of the message presenting layer, a reminding manner of the message presenting, a presenting manner of the message, a presenting location of the message, presenting time of the message, a hiding manner of the message, or a reading manner of the message.

5. The method according to claim 4, further comprising, after the client side receives the message sent by the VMC according to the link established by the VMC:
caching, by the client side, the message according to a read cache parameter; and
presenting, by the client side, the cached message according to a read presenting parameter.

6. A message transmission apparatus, applied in a virtual machine control center (VMC) comprising:

an establisher configured to establish a link of a message transmission with a client side, wherein, the client side is configured to link and operate a virtual machine; and a transmitter configured to perform the message transmission with the client side according to the established link;

wherein the establisher is configured to establish the link of the message transmission with the client side by at least one of:

establishing a link of the message transmission with the client side by using a Main Channel of a simple protocol for independent computing environment (SPICE) protocol according to identity (ID) information of the client side;

establishing a transfer control protocol (TCP) link of the message transmission with the client side according to identity (ID) information of the client side; or establishing a user datagram protocol (UDP) link of the message transmission with the client side according to identity (ID) information of the client side;

wherein the transmitter is configured to:

when the link is established by using the Main Channel of the SPICE protocol, perform at least one of: package a message to be sent to a message in a SPICE Main Channel form and send the packaged message to the client side, or, receive a message, in a SPICE Main Channel form, sent by the client side;

when the link is the TCP link, perform at least one of: package a message to be sent to a message in a TCP form and send the packaged message to the client side, or, receive a message, in a TCP form, sent by the client side; and when the link is the UDP link, perform at least one of: package a message to be sent to a message in a UDP form and send the packaged message to the client side, or, receive the message, in a UDP form, sent by the client side.

7. A non-transitory computer-readable storage medium storing computer-executable instructions that, when executed by a processor, cause the processor to perform the method according to claim 1.

8. A non-transitory computer-readable storage medium storing computer-executable instructions that, when executed by a processor, cause the processor to perform the method according to claim 2.

9. A non-transitory computer-readable storage medium storing computer-executable instructions that, when executed by a processor, cause the processor to perform the method according to claim 3.

10. A non-transitory computer-readable storage medium storing computer-executable instructions that, when executed by a processor, cause the processor to perform the method according to claim 5.

* * * * *

UNITED STATES PATENT AND TRADEMARK OFFICE
CERTIFICATE OF CORRECTION

PATENT NO. : 10,616,366 B2
APPLICATION NO. : 15/737171
DATED : April 7, 2020
INVENTOR(S) : Ning Zhang Page 1 of 1

It is certified that error appears in the above-identified patent and that said Letters Patent is hereby corrected as shown below:

In the Drawings

In sheet 5 of 8, FIG. 7, reference numeral S706, Line 2, delete "informationto" and insert --information to--.

In the Specification

In Column 4, Line 47, delete "or," and insert --and/or,--.

In Column 13, Line 51, delete "rotating;" and insert --rotating.--.

In Column 19, Line 2, delete "invention," and insert --disclosure,--.

In Column 19, Line 3, delete "invention." and insert --disclosure.--.

In Column 19, Line 4, delete "invention" and insert --disclosure--.

In Column 19, Line 7, delete "invention" and insert --disclosure--.

In Column 19, Line 8, delete "invention." and insert --disclosure.--.

Signed and Sealed this
Eighth Day of December, 2020

Andrei Iancu
*Director of the United States Patent and Trademark Office*